March 21, 1933.  D. W. HOGE  1,902,073
METHOD OF TREATING RESINS
Original Filed Dec. 19, 1928
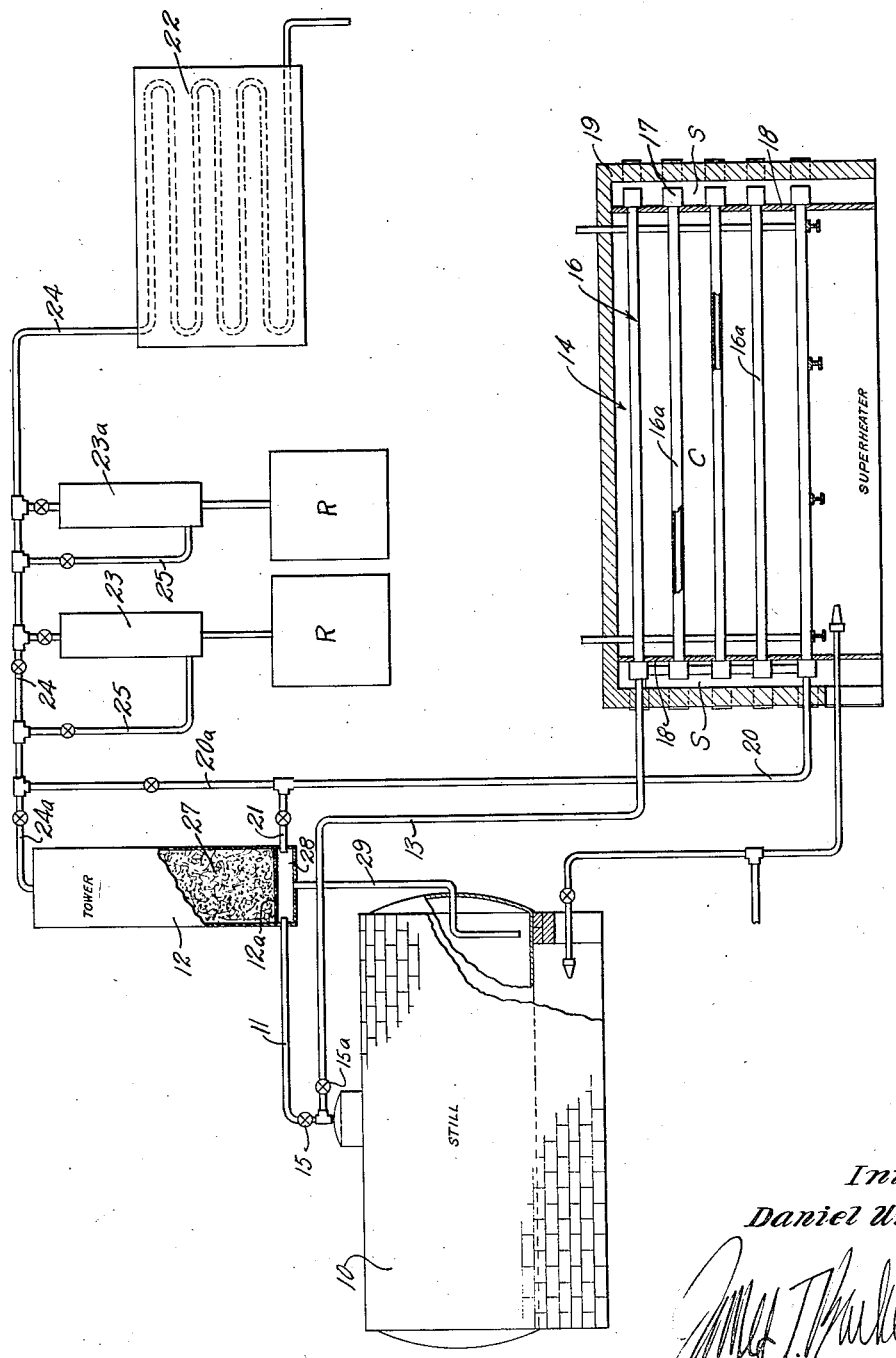
Inventor
Daniel W. Hoge.
Attorney.

Patented Mar. 21, 1933

1,902,073

UNITED STATES PATENT OFFICE

DANIEL W. HOGE, OF LOS ANGELES, CALIFORNIA, ASSIGNOR TO CARLOS W. NEWBERY, OF LOS ANGELES, CALIFORNIA

METHOD OF TREATING RESINS

Application filed December 19, 1928, Serial No. 327,013. Renewed August 26, 1932.

This invention has to do with distillation systems, and relates particularly to a method for treating resinous materials by distillation and thermal decomposition or cracking of crude resins, to produce relatively light and volatile liquid products.

The present system is adapted to be applied to the treatment of resins commonly found in many species of plants, for instance coniferæ, which specie comprises the various kinds of pine trees. It has been found, however, that the system is particularly suited to the treatment of rosin contained in the exudate obtained from living pine trees, or in extract from dead trees, and known as crude turpentine, the rosin being obtained from the crude exudate as residue after the lighter turpentine fractions, or spirits of turpentine, are distilled off. I will, therefore, describe the invention as applied to the treatment of this particular resinous material. It will be noted that the term "resin" applies to a general classification of secretions from a variety of types of plants and that the word "rosin" refers particularly to the hardened residue obtained from crude turpentine as described.

Due to the great demand and production of refined turpentine there is necessarily produced a vast supply of rosin which, heretofore, has been of comparatively less value and more or less restricted as to its uses. In view, therefore, of the desirability of utilizing the residual rosin to its greatest possible extent, I have provided the present method for treating rosin to produce a variety of products having a wide range of utility, and which may be produced most economically, especially in view of the present low cost of crude rosin.

By means of the present system, which will later be described in detail, there is produced from common gum or wood rosins, which are of course solid, a series of liquid products ranging in boiling point, generally speaking, from about 80° F. to 600° F., the average gravity of these products being around 35° Bé. As typical examples of uses to which certain of the products are particularly well suited, a few may be given and the corresponding product or "cut" may be identified according to its boiling range. Thus a fraction having a boiling range of 170° F. to 325° F. is suited for use in the manufacture of lacquers as a gum solvent, and a cut 80° F. to 375° F. serves to render ordinary gasoline non-detonating when about 10% by volume of the rosin product is mixed with gasoline. It is necessary in preparing lacquers that a suitable material, commonly termed a plasticizer, be added for rendering the dried lacquer sufficiently flexible to reasonably withstand impact without shattering, and for this purpose a fraction between 375° F. and 480° F. may be added to the lacquer mix to give it, when dried, the aforesaid property. Various fractions may be selected for use in preparing paints, varnishes and the like, and it is unnecessary to enumerate their various uses in detail.

The present system for treating rosin and the manner of obtaining the above named products will be understood most clearly from the following detailed description thereof, reference being made in the description to the accompanying drawing in which there is shown diagrammatically a typical form of apparatus for carrying out my process.

Numeral 10 in the drawing indicates a retort or still which may be of any suitable design, and which is adapted to be charged with solid rosin preparatory to starting operations. The still is heated to sufficient temperature to vaporize the rosin, or, more properly speaking, to decompose the rosin and to cause products of decomposition to be liberated in the form of vapor. That thermal decomposition of the rosin takes place is evidenced by the fact that the melted rosin in the still is at substantially higher temperature than the vapors rising therefrom. As will later be described, vapors may pass from the still either through line 11 to the tower 12, or they may be conducted through line 13 to the superheater or cracking still 14, by correspondingly adjusting valves 15 and 15a. Satisfactory operation is had by maintaining a shell still temperature of from about 550° F. to 800° F., which may be considered as typical, and usually it is not necessary to apply pressure to the still, although moderate pressures, say up to 25 lb. per sq. in. may be used.

Although any suitable form of superheater may be embodied for heating the vapors from still 10, I prefer to use the particular form of superheater shown. The superheater embodies, briefly, a concentric double pipe coil 16, the various units or lengths 16a of which are connected in series by means of suitable fittings 17, the coil being mounted on suitable baffle or end plates 18 in such a manner that the fittings are contained within the spaces S between the end plates and the brick work 19, so as not to be exposed to the hot gases within the combustion chamber C through which the concentric pipe units 16a extend. As described in the referred copending application, the two concentric pipes in each unit are spaced, and the space between them filled with lead in order that the inner pipe, through which the vapors flow, may be subjected to even temperatures throughout their lengths during operation, and thereby preventing the deleterious effects of local overheating. This type of superheater is particularly satisfactory for the present purposes in that it may be employed to effect superheating and cracking of the vapors with minimum depositing in the tubes of carbonaceous or coky materials.

Thus the vapors from the shell still are subjected to cracking in the superheater, with the resultant breaking down of the molecular structure of these vapors to produce relatively light vapors which, when condensed, result in a liquid product having a comparatively wide range of volatility. The cracked vapors from the superheater flow through line 20, and thence either through line 21 into the tower 12, or through line 20a to suitable condensing or fractionating apparatus. In some instances the entire vapor stream in line 20a may be condensed and treated as product, or any suitable fractionating means may be employed for fractionating the vapors to produce cuts corresponding to fractions of the said liquid product obtainable by complete condensation. As typical means for producing the desired liquid fractionation, I have illustrated the condenser 22 and what may be considered either as partial condensers or fractionating columns 23 and 23a, of which there may be any suitable number. By the system of piping shown, the vapors may be passed directly through line 24 to condenser 22, or they may be by-passed by way of lines 25 through the fractionating columns, the products from which are delivered to the receivers R. Generally speaking the cracking temperature in the superheater need not greatly exceed 1100° F., and the pressure preferably is maintained fairly low, say substantially atmospheric or below 25 lb. per sq. in.

The tower 12, as previously mentioned, may receive vapors directly from still 10 by way of line 11, or from the superheater through line 21 by properly adjusting the valves indicated. The general purpose of the tower is to provide means for bringing the vapors intimately into contact with a suitable material which, by catalytic action, serves to effect further decomposition or cracking of the vapors, and for this purpose any desired form of tower may be provided. Although I have found that various catalytic materials, especially metals, may be employed for the present purpose, which catalysts vary according to their relative efficiency in effecting the decomposition of the vapors, metallic aluminum has been found to be especially effective in cracking the vapors by catalytic action. It will be understood that the metallic aluminum so used may be of any suitable degree of fineness, so long as the vapors have free access therethrough, and also that such metallic aluminum may be incorporated or included with other materials in effecting the decomposition reaction. In this regard, it has been found that such catalytic action is had by a mixture of aluminum and nickel, but not to such a high degree as by using aluminum alone.

In the illustrated tower 12, the aluminum 27 in the form of shavings or common kinds of tower packing, is contained on a perforated grid 12a spaced at 28 from the bottom of the tower. Comparatively heavy vapors from this space then flow upwardly through the aluminum packing, the latter serving as a catalyst to decompose the rising vapors. Whatever condensate accumulates in the tower is led back into the still through line 29. The light cracked vapors from the tower flow through line 24a to the condensing and fractionating apparatus, wherein they may be treated as previously described. It will be noted that aside from its described purpose, the tower serves, in addition, as a dephlegmator. The temperature and pressure of the vapors in the tower correspond to the source from which the vapors are supplied, that is, vapors from the shell still pass through the tower about superheater temperature and pressure.

In the treatment of rosin by the present process, I have found that the vapor stream from the shell still may be passed directly into the tower and the vapors decomposed therein by catalytic action and subsequently fractionated, or the vapors may be cracked by passing directly from the still through the superheater and then fractionated. In addition, these two steps may be combined and the vapors, having been subjected to preliminary cracking in the superheater, may be further decomposed in the tower and then fractionated as described.

It has been noted that the nature of the final product obtained is effected according to the particular manner in which the vapors from the shell still are subsequently treated, as evidenced by the following data which is typical of results obtained by passing the vapors through the tower, and in another instance by subjecting them to cracking in the superheater alone. Thus a product representing the total condensate obtained from vapors passed directly from still 10 through the tower was found to have a boiling range of about 120° F. to 480° F. and to have a gravity of about 32° Bé. The product obtained condensing the entire vapor stream from the superheater was found to have a boiling range of approximately 80° F. to 375° F., with a gravity of 38° Bé. During the runs in which these products were obtained, the temperature of the liquid rosin in the shell still was increased from 620° F. to 800° F., and the superheater temperature decreased from 1080° F. to 850° F.

The above tests and temperatures may be considered as typical of operating conditions and results obtained in the present system, although it will be understood that these may be varied within comparatively wide limits in accordance with the quality of products desired.

It may be noted that the products obtained by use of the shell still in combination with the superheater are of comparatively low boiling point, and therefore that products having comparatively high boiling points, as for instance, the previously mentioned fraction between 375° F. and 400° F. for use as a plasticizer lacquer preparation, is obtained from the fractionation of the condensate resulting from the treatment of vapors in the tower, which condensate has an end point of 480° F. or above.

During the period in which the charge in the shell still is heated to suitable operating temperature, and during the early portion of a distillation, an acid liquid is obtained from the condenser, this liquid being in the nature of a preliminary product of decomposition of the rosin and comprising a substantial quantity of acetic acid. The amount of acid liquid obtained under certain conditions represents about 15% of the total condensate produced during a run. At the conclusion of the production of the acid liquor, the more volatile of the oil products hereinabove mentioned are distilled, and their production continues until the still charge has been reduced to the desired extent, which extent may represent practically any percentage of the original charge.

I claim:

1. A method for distilling crude rosin that includes heating and vaporizing crude rosin in a vaporizing zone, subjecting the vapors to cracking in a cracking zone at a temperature between 700° F. and 1100° F., and fractionating the cracked vapors to produce liquid fractions thereof.

2. A method for distilling crude rosin that includes heating and vaporizing crude rosin in a vaporizing zone, subjecting the vapors to cracking in a cracking zone at a temperature between 700° F. and 1100° F. and at substantially atmospheric pressure, and fractionating the cracked vapors to produce liquid fractions thereof.

3. A method for distilling crude rosin that includes heating and vaporizing crude rosin in a vaporizing zone at a temperature below 800° F., cracking the vapors in a cracking zone at a temperature not exceeding substantially 1100° F., and at a pressure not exceeding substantially 25 lbs. per sq. in. gage, and fractionating the cracked vapors to produce liquid fractions thereof.

4. The method of distilling crude rosin that includes, heating and vaporizing crude rosin in a vaporizing zone, conducting the vapors in a stream having a long path of flow through a superheated cracking zone in which the vapors are cracked at a temperature between 700° F., and 1100° F., and then subjecting the vapors to fractionation.

5. The method of distilling crude rosin that includes, heating and vaporizing crude rosin in a vaporizing zone, conducting the vapors in a stream having a long path of flow through a superheated cracking zone in which the vapors are cracked at a temperature between 700 F., and 1100 F., maintaining the vapor stream during the cracking operation under uniform heating conditions whereby localized overheating is prevented, and finally subjecting the cracked vapors to fractionation.

In witness that I claim the foregoing I have hereunto subscribed my name this 2nd day of November 1928.

DANIEL W. HOGE.